United States Patent
Taylor

(10) Patent No.: US 7,325,779 B2
(45) Date of Patent: Feb. 5, 2008

(54) CLIP

(76) Inventor: Kevin D. Taylor, 1716 N. 1900 West, Ogden, UT (US) 84404

( * ) Notice: Subject to any disclaimer, the term of this patent is extended or adjusted under 35 U.S.C. 154(b) by 0 days.

(21) Appl. No.: 10/765,609

(22) Filed: Jan. 26, 2004

(65) Prior Publication Data

US 2005/0061936 A1    Mar. 24, 2005

Related U.S. Application Data

(60) Provisional application No. 60/443,199, filed on Jan. 27, 2003.

(51) Int. Cl.
*A47B 97/02* (2006.01)
(52) U.S. Cl. .................. 248/451; 248/229.16
(58) Field of Classification Search ............. 248/229.1, 248/229.16, 231.81, 316.7, 451; 24/489, 24/499, 530
See application file for complete search history.

(56) References Cited

U.S. PATENT DOCUMENTS 6,347,774 B1 *  2/2002  van der Molen ....... 248/231.71
6,470,613 B1 * 10/2002  Wildrick .................. 40/661.03
D478,805 S  *  8/2003  Winig et al. ................. D8/367
6,899,304 B2 *  5/2005  Bellmore et al. ............. 248/65
6,923,406 B2 *  8/2005  Akizuki ....................... 248/71

* cited by examiner

*Primary Examiner*—Anita King
*Assistant Examiner*—Steven Marsh
(74) *Attorney, Agent, or Firm*—Fehr Law Firm; Thompson E. Fehr

(57) ABSTRACT

A clip having a main member with a first side, a second side, a first end, and a second end. A first substantially planar member has a first end connected to a first end of a second substantially planar member. The outside of the vertex formed by the substantially planar members is connected to the first side of the main member intermediate the ends of the main member. In use, the substantially planar members contact the rear and outside edge of a frame for a canvas. A short hook is connected to the first end of the main member and, in use, presses against the front of the frame. And a long hook is attached to a second end of the main member and, in use, presses against the inside edge of the frame. A variety of attachments may be made to the second side of the main member.

6 Claims, 7 Drawing Sheets

CLIP

CROSS-REFERENCE TO RELATED APPLICATION

This application claims the benefit of U.S. provisional application No. 60/443,199, filed on Jan. 27, 2003.

BACKGROUND OF THE INVENTION

1. Field of the Invention

This invention relates to a clip for attaching items to a frame, especially to the frame for the canvas of a painting.

2. Description of the Related Art

U.S. Pat. No. 3,998,421 covers a holder for articles such as sketches being copied that hooks to an artist's easel with traditional clamps.

A somewhat similar holder, which also utilizes traditional clamps, hooks a sketch or photograph to the frame for the canvas of a painting and is available from Dick Blick Art Materials of Galesburg, Ill.

It seems, however, that both of the preceding devices have significant potential for the clamps to mar the easel or frame.

And U.S. Pat. No. 3,286,847 applies to and artist's brush holder that clips to an artist's palette. It appears, though, that the clip of that device could easily be dislodged.

BRIEF SUMMARY OF THE INVENTION

The present Clip has two substantially planar members connected substantially perpendicularly to each other along one end of each such planar member. These planar members are attached on the outside of the vertex of the two substantially planar members to a first side of a main member intermediate the ends of the main member.

At a first end of the main member is attached a short hook; at a second end of the main member is attached a long hook The substantially perpendicular substantially planar members are designed to contact the rear and outside edge of a frame while the short hook, because of its location and flexible structure, presses against the front of the frame in a direction substantially perpendicular to the substantially planar member that touches the rear of the frame and while the long hook presses against the inside edge of the frame in a direction substantially perpendicular to the substantially planar member that touches the outside edge of the frame.

The long hook is curved in the shape of a comma to facilitate installation and prevent marring of the frame. The more abrupt curve of the comma is more remote from the main member.

A variety of fastening device are optionally attached to a second side of the main member.

BRIEF DESCRIPTION OF THE SEVERAL VIEWS OF THE DRAWING

FIG. 5 portrays an arm for holding pictures or the like.

DETAILED DESCRIPTION OF THE INVENTION

The Clip of the present invention is designed to be made from a material that is flexible but also memory stable. Preferably, this material is plastic which can be injection molded.

Figure 1:
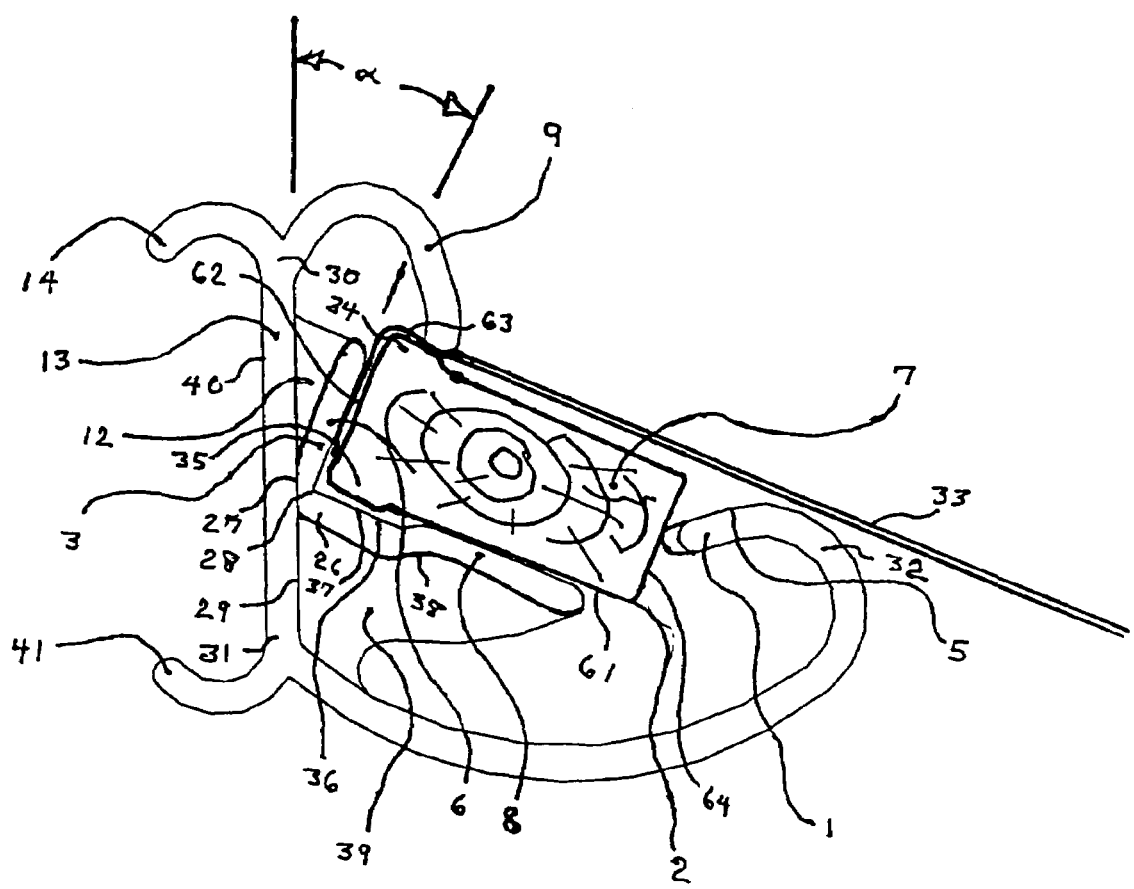
FIG. 1 is a plan view of the Clip attached to a frame, where the view of the frame is a cutaway cross-sectional view for clarity of illustration.

As illustrated in FIG. 1, a first substantially planar member 6 has a first end 3 connected to a first end 26 of a second substantially planar member 8. Preferably, substantially planar members 6, 8 are planar. The angle between the substantially planar members 6, 8 is substantially ninety degrees and preferably is ninety degrees. In use, the first substantially planar member 6 contacts the outside edge 62 of the frame, generally a wood frame, 7; and the second substantially planar member 8 contacts the rear 61 of the frame 7.

The first substantially planar member 6 and the second substantially planar member 8 are attached near the vertex 28 on the outside 27 of the vertex 28 formed by the two substantially planar members 6, 8 to a first side 29 of a main member 13 intermediate the first end 30 and the second end 31 of the main member 13.

Connected to the first end 30 of the main member 13 is a first end of a short hook 9 which curves to the first side 29 of the main member 13; at the second end 31 of the main member 13 is attached a first end of a long hook 1 which also curves to the first side 29 of the main member 13.

When the Clip has been installed on a frame 7, the short hook 9 presses against the front 63 of the frame 7 in a direction substantially perpendicular to the first substantially planar member 6 while the long hook 1 presses against the inside edge 64 of the frame 7 in a direction substantially perpendicular to the second substantially planar member 8.

As discussed above, the long hook 1 is curved in the shape of a comma, with the more abrupt curve 32 of the comma being more remote from the main member 6 and having its distal portion 5 serve as a ramp to facilitate the long hook 1 sliding past the inside corner 2 of the frame 7 during the process of installing the Clip and also serve to tend to push harder into the frame 7 if the Clip is tried to be dislodged without someone pulling the long hook 1 away from the frame 7.

Because of the flexibility and memory stable quality of the Clip, the long hook 1 enables the Clip to accommodate minor differences in the size and shape of frames 7.

The wooden frames used for stretching canvas 33 have a first ridge 34 on the front 63 of the frame 7 and a second ridge 35 on the rear 61 of the frame 7. The first ridge 34 suspends the canvas 33 above the rest of the front of the frame 7 when the canvas 33 is stretched.

When canvas 33 has been installed, the short hook 9 actually touches the canvas 33 as it presses against the front of the frame 7. In selecting the dimensions of the short hook 9 it is preferable to assure that the short hook 9 will not extend beyond the first ridge 34 of the frame 7 toward the inside edge 64 of the frame 7. The external frame traditionally installed on finished paintings would hide such inadvertent scuff marks as may occur on the canvas 33 only if such scuff marks do not extend beyond the portion 35 of the canvas 33 that overlies the first ridge 34.

The flat nature of the substantially planar members 6, 8 reduces the possibility of the Clip's marring areas of the frame 7 which are most likely to be visible, viz., the rear 61 and the outside edge 62. In order further to enhance this protection and better to seat the Clip, the second substantially planar member 8 incorporates a step or indentation 36 on the first side 37 of the second substantially planar member 8 substantially adjacent to the first end 3, which step 36 accommodates the second ridge 35. It is immaterial whether this step 36 also exists on the second side 38 of the second substantially planar member 8.

The first substantially planar member 6 makes an angle α with the main member 13. This angle α can be whatever is desired between zero degrees and ninety degrees. Preferably, it is ten degrees.

In order to increase stiffness and strength of the first substantially planar member 6 and the second substantially planar member 8, a first support structure 12 is connected between the first substantially planar member 6 and the main member 13; and a second support structure 39 is connected between the second substantially planar member 8 and both the main member 13 and the long hook 1.

At least four options exist for the second side 40 of the main member 13.

First, a hook 14 is attached to the first end 30 of the main member 13 with the hook curving to the second side 40 of the main member 13 and ultimately toward the second end 31 of the main member 13; and an opposing hook 41 is connected to the second end 31 of the main member 13 curving to the second side 40 of the main member 13 and ultimately toward the first end 30 of the main member 13. Such hook 14 and opposing hook 41 can, for example, be utilized to attach to the Clip a holder such as the one covered by U.S. Pat. No. 5,072,904.

Figure 2:
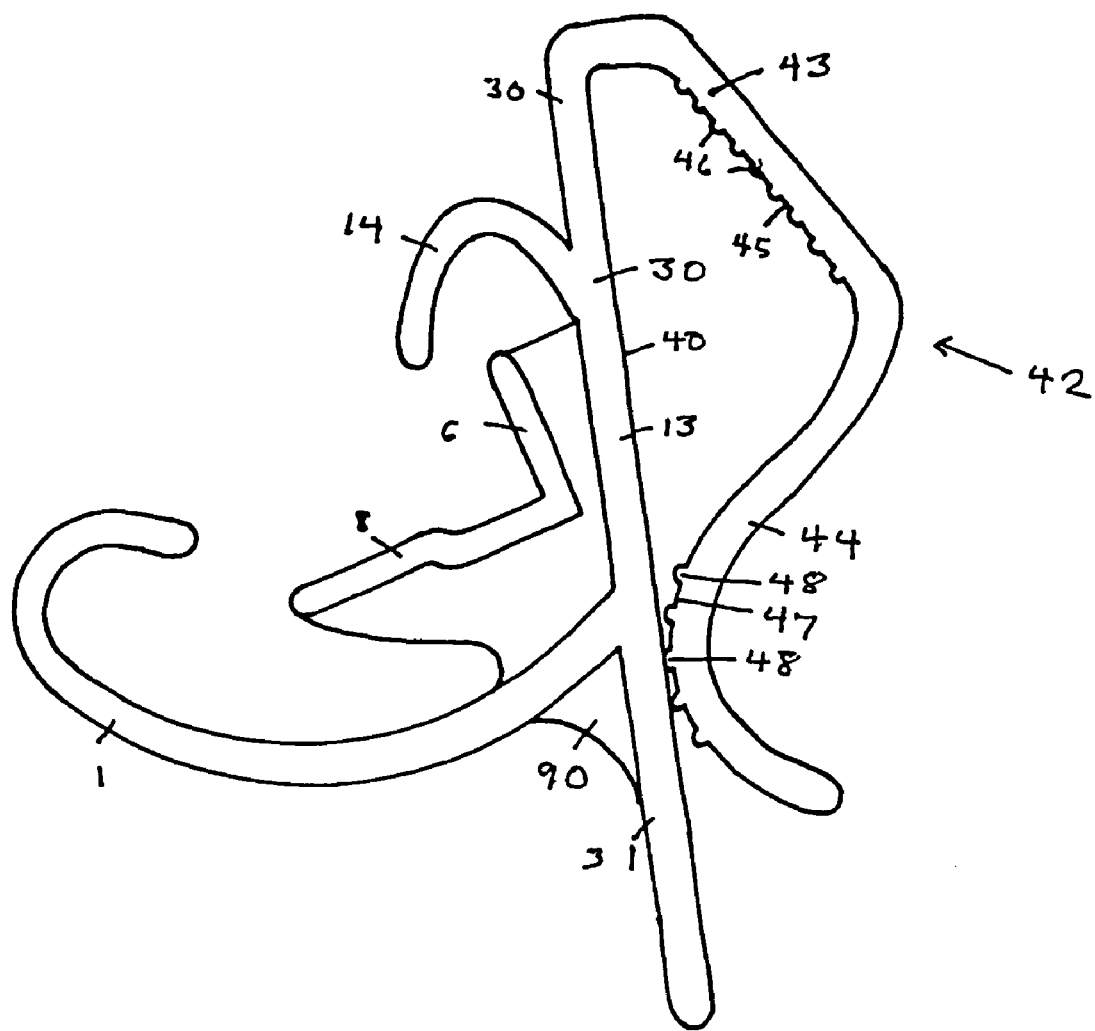
FIG. 2 depicts a loop attached to the second side of the main member of the Clip for connecting the Clip to a table or a desk so that a canvas on a frame could be held on the first side of the main member with the Clip attached on the second side of the main member to the table or desk.

Second, as illustrated in FIG. 2, a flexible arm 42 is attached to the first end 30 of the main member 13. The first portion 43 of the flexible arm 42 curves away from the second side 40 of the main member 13 before turning toward the second end 31 of the main member 13 and then back toward the second side 40 of the main member 13 while the second portion 44 of the flexible arm 42 continues curving toward the main member 13 before nearing or touching the second side 40 of the main member 13 and again curving away from the second side 40 of the main member 13. The second end 31 of the main member 13 is preferably extended and connected to a supplemental support 90, which supplemental support is also attached to the long hook 1 near the main member 13. Preferably, a first side 45 of the first portion 43, which first side 45 faces the second side 40 of the main member 13, contains projections or serrations 46; and, preferably, a first side 47 of the second portion 44, which first side 47 faces the second side 40 of the main member 13, contains projections or serrations 48. With the flexible arm 42, the Clip can attach a frame 7 holding a canvas 33 to a table or desk. The projections or serrations 48 tend rigidly to resist torsional movement caused by pressure applied to the canvas 33 while the flexibility of the flexible arm 42 together with its memory stable quality permit the flexible arm 42 to adjust to tables or desks of different thickness.

Figure 3:
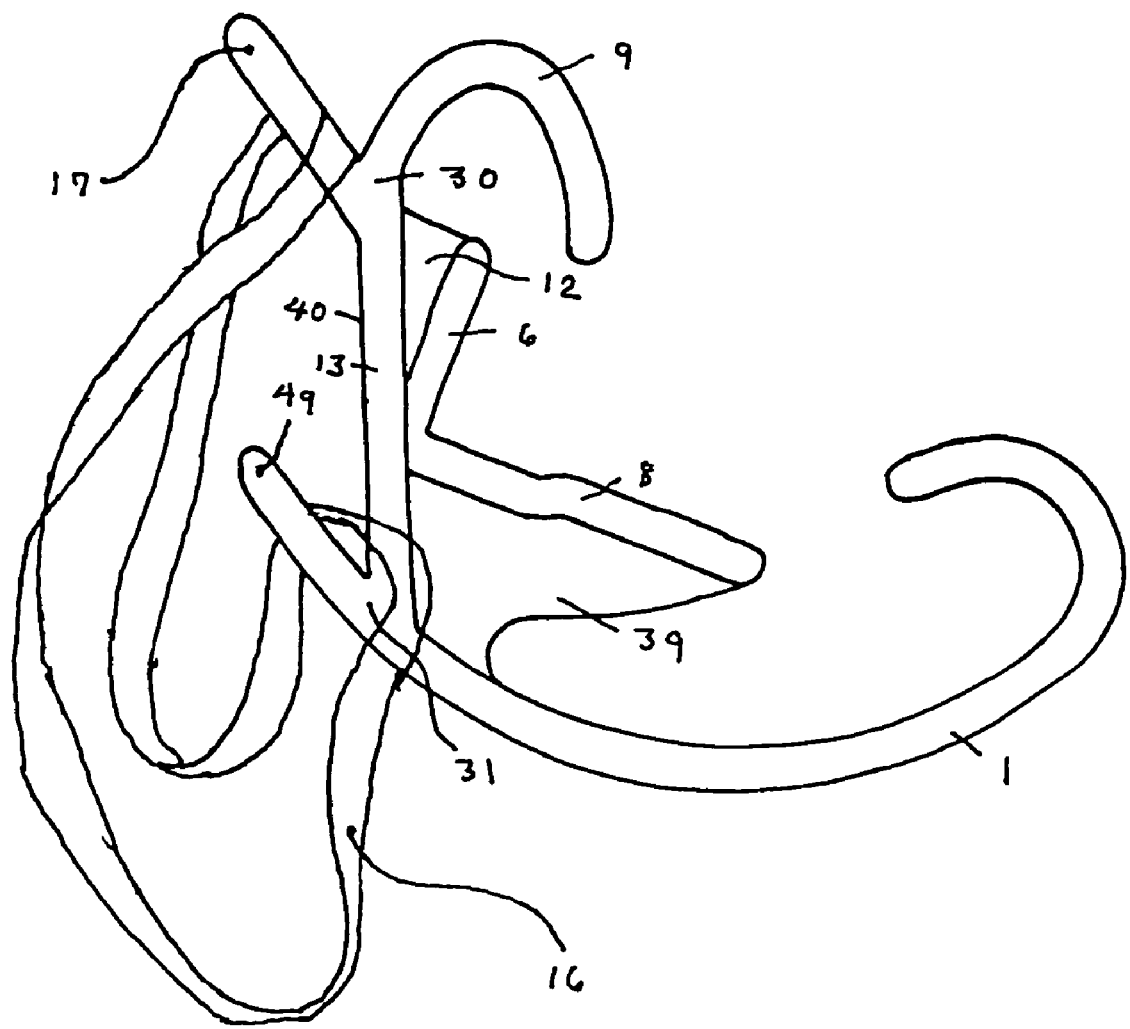
FIG. 3 shows hooks attached to the second side of the main member of the Clip for use with rubber bands to secure the Clip to a frame.

Third, as portrayed in FIG. 3, a first retention bar 17 is attached to the first end 30 of the main member 13 extending on the second side 40 of the main member 13 away from the main member 13 and also away from the second end 31 of the main member 13. Similarly, a second retention bar 49 is attached to the second end 31 of the main member 13 extending on the second side 40 of the main member 13 away from the main member 13 and toward the first end 30 of the main member 13. In adverse or windy conditions, the frame 7 and canvas 33 are fastened to an easel with one or more rubber bands 16, using the first retention bar 17 and the second retention bar 49.

Figure 4:
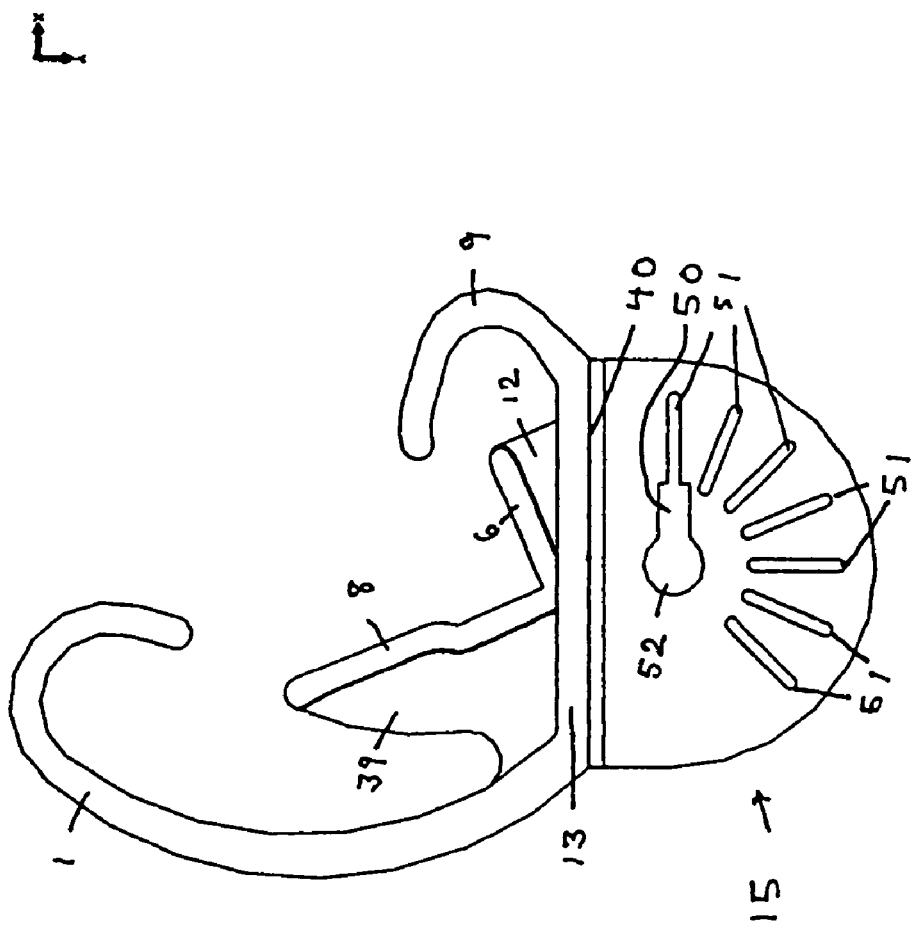
FIG. 4 illustrates a hub attached to the second side of the main member of the Clip.

Fourth, as shown in FIG. 4, attached to and extending from the second side 40 of the main member 13 is a generally planar hub 15 having a keyhole-shaped center aperture 50 and preferably also having one or more détentes 51 radially arranged around the head 52 of the keyhole-shaped center aperture 50.

Figure 5:
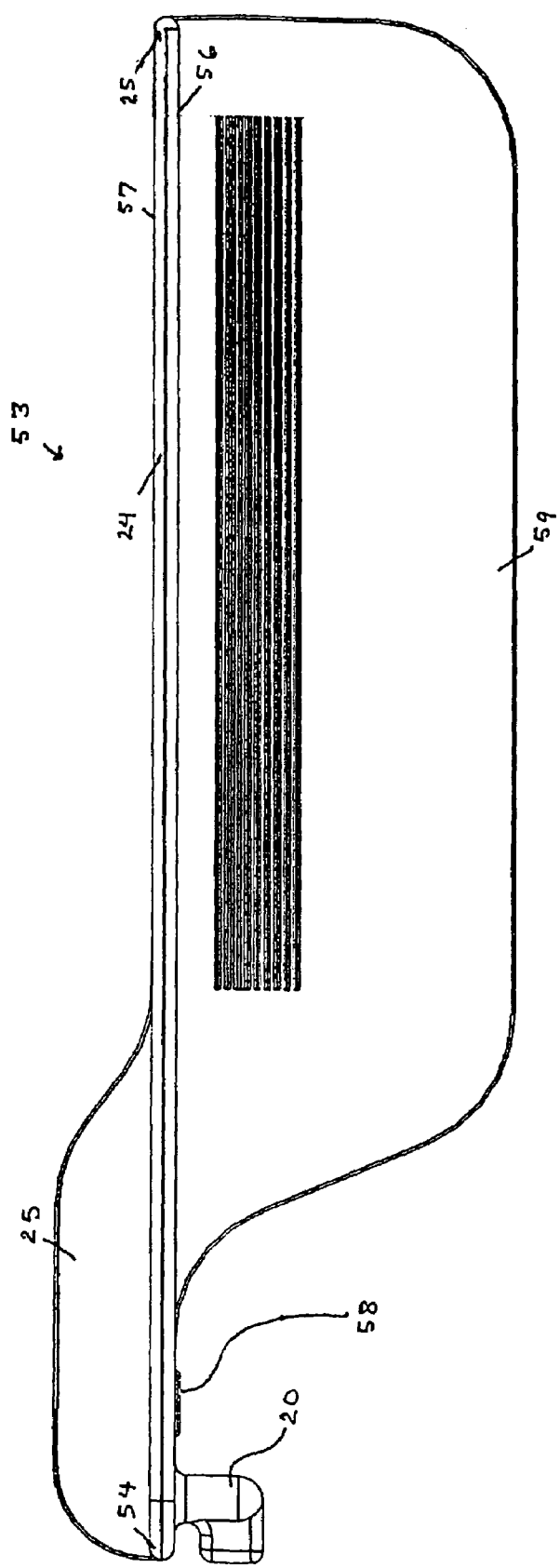
Figure 6:
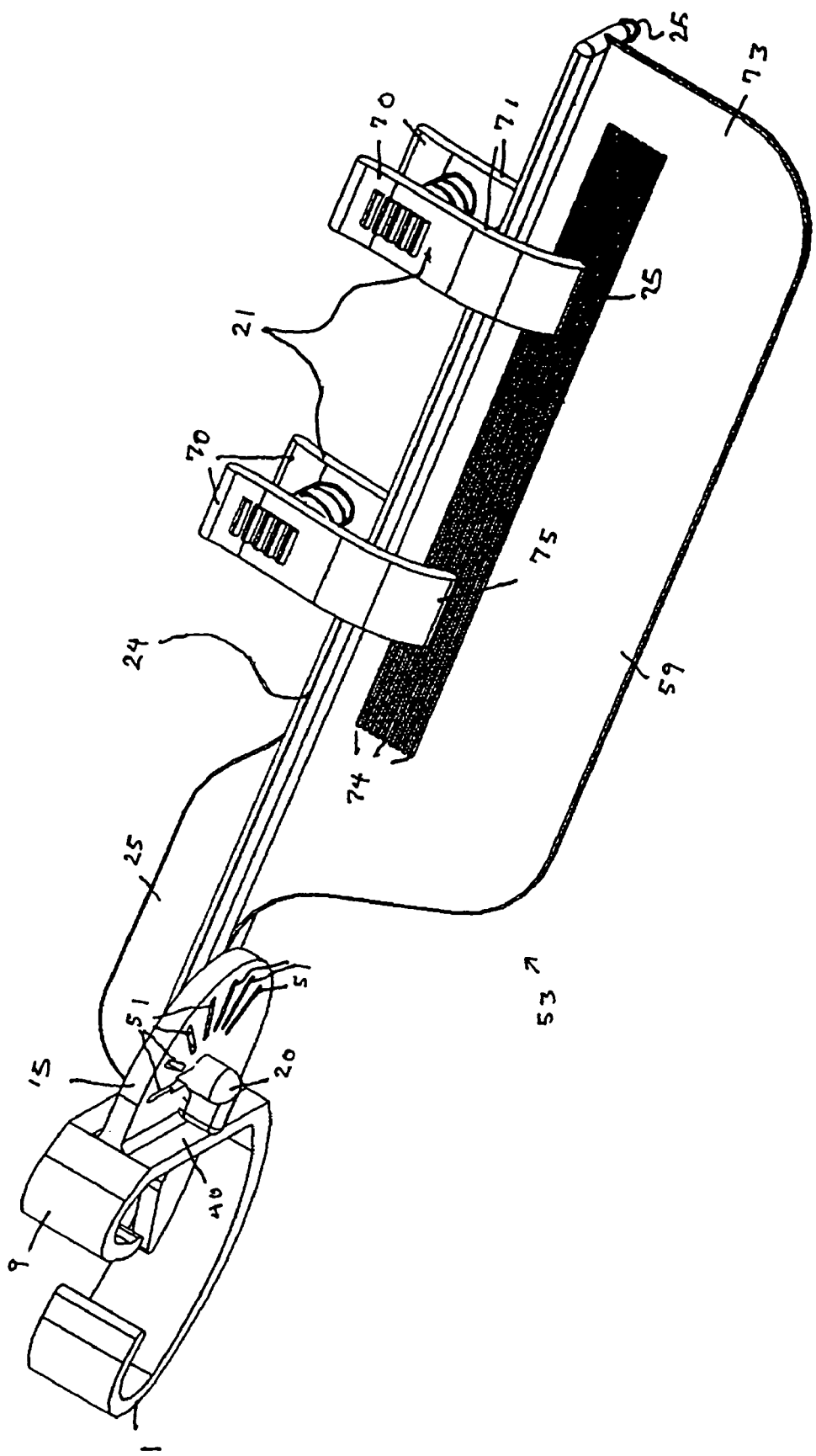
FIG. 6 depicts the arm of FIG. 5 attached to the hub of the embodiment shown in FIG. 2.

As illustrated in FIG. 5 and FIG. 6, an arm 53 has an elongated substantially planar platform 24 with a first end 54, a second end 55, a first side 56, and a second side 57. Attached to the first side 56 of the platform 24 near the first end 54 of the platform 24 is a keyhole-shaped center pin 20 which can be inserted through the keyhole-shaped center aperture 50 and rotated to hold the arm 53 in the keyhole-shaped center aperture 50. Preferably, connected to the first side 56 of the platform 24 is a raised section 58 with dimensions selected such that the raised section 58 fits into any of the détentes 51 to hold the arm 53 in one or more discrete angular positions.

Also on the first side 56 of the arm 53 but farther toward the second end 55 of the arm 53 than is the raised section 58 is a flat panel 59. On the second side 57 of the platform 24 commencing farther from the first end 54 than the flat panel 59 commences and running toward the first end 54 is a first stop 25. Near the second end 55 of the platform 24 is a second stop 25.

Figure 7:
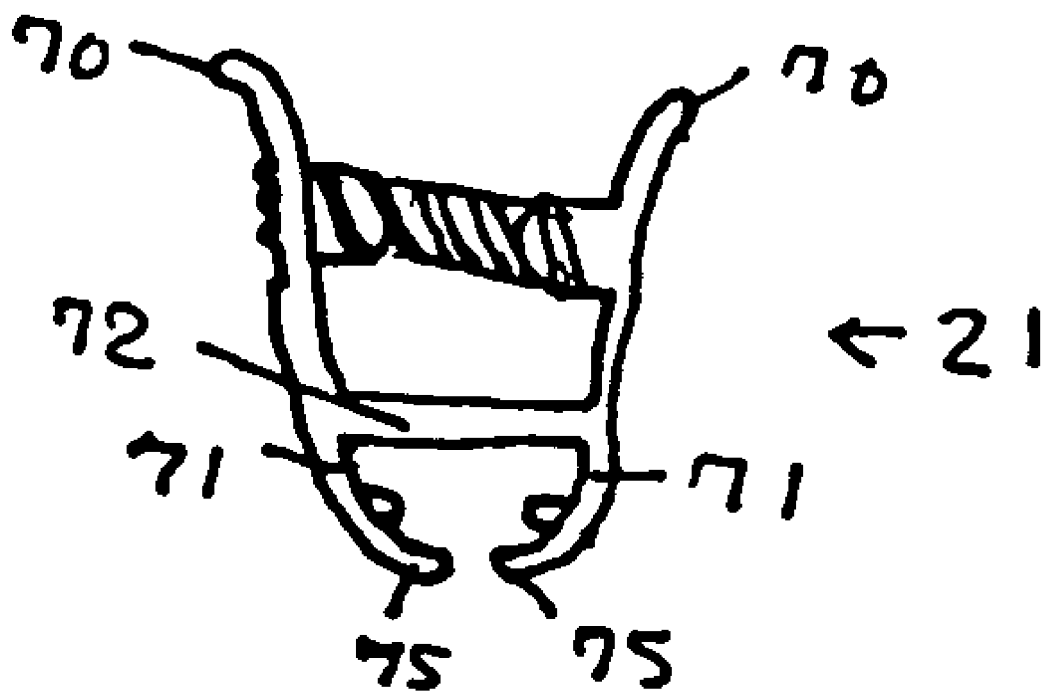
FIG. 7 is a lateral view of a clip used with the arm of FIG. 5, as shown in FIG. 6.

One or more spring-loaded clamps 21 are slidably mounted to the platform 24. The stop 25 precludes the spring-loaded clamps 21 from inadvertently passing the second end 55 of the platform 24 by engaging the sides 71 of the clamps 21 unless the tops 70 of the clamps 21 are squeezed close to each other. The first stop 25 precludes the clamps 21 from sliding past the first end 54 of the platform 24. Any type of stop that will engage a clamp 21 is adequate. Preferably, though, the first stop 25 engages the horizontal bar 72 of the clamp 21 which is shown in FIG. 7.

Preferably, one or more sides 73 of the flat panel 59 contain longitudinal ribs or channels 74 to enhance the gripping action of the spring-loaded clips 21 by being contacted by the gripping end 75 of the spring-loaded clips 21.

The arm 53 can be installed on either the left side or the right side of a canvas 33 to hold, for example, a photograph or sketch. Other tools used by an artist, such as a portable light or paper towel dispenser, could similarly be attached to the hub 15.

As used herein, the term "substantially" indicates that one skilled in the art would consider the value modified by such terms to be within acceptable limits for the stated value. Also as used herein, the term "preferable" or "preferably" means that a specified element or technique is more acceptable than another but not that such specified element or technique is a necessity.

I claim:

1. A clip, which comprises:
    a first substantially planar member having a first end and an indentation substantially adjacent to such first end;
    a second substantially planar member having a first end connected to the first end of said first substantially planar member and thereby forming an interior angle of substantially ninety degrees as well as creating an outside of a vertex, said second substantially planar member also incorporating a step on a first side of said second substantially planar member;

a main member having a first end, a second end, a first side, and a second side with said first substantially planar member and said second substantially planar member connected near the vertex and on the outside of the vertex to the first side of said main member intermediate the first end and the second end of said main member, said first substantially planar member thereby making an angle with said main member that is between zero degrees and ninety degrees;

a short hook having a first end connected to the first end of said main member, said short hook curving to the first side of said main member;

a long hook having a first end attached to the second end of said main member, said long hook curving to the first side of said main member in the shape of a comma with the more abrupt curve of the comma being more remote from said main member;

a first support member connected between said first substantially planar member and said main member; and a second support member connected between said second substantially planar member and both said main member and said long hook, wherein said first substantially planar member, said second substantially planar member, said main member, said short hook, said long hook, said first support member, and said second support member are all composed of material that is flexible but also memory stable.

2. The clip as recited in claim 1, further comprising:

a generally planar hub attached to and extending from the second side of said main member, said hub having a keyhole-shaped center aperture and one or more détentes radially arranged around a head of the keyhole-shaped center aperture;

an elongated substantially planar platform having a first end, a second end, a first side, and a second side;

a keyhole-shaped center pin attached to the first side of said platform;

a raised section with dimensions selected such that said raised section fits into any of the détentes of said hub;

a flat panel located on the first side of said platform but farther toward the second end of said flat panel than is the raised section;

a first stop located on the second side of said platform, commencing farther from the first end of said platform than the flat panel commences and running toward the first end of said platform;

a second stop located near the second end of said platform; and one or more spring-loaded clamps slidably mounted to said platform.

3. The clip as recited in claim 1, wherein:

the material that is flexible but also memory stable is plastic which can be injection molded.

4. The clip as recited in claim 3, further comprising:

a generally planar hub attached to and extending from the second side of said main member, said hub having a keyhole-shaped center aperture and one or more détentes radially arranged around a head of the keyhole-shaped center aperture;

an elongated substantially planar platform having a first end, a second end, a first side, and a second side;

a keyhole-shaped center pin attached to the first side of said platform;

a raised section with dimensions selected such that said raised section fits into any of the détentes of said hub;

a flat panel located on the first side of said platform but farther toward the second end of said flat panel than is the raised section;

a first stop located on the second side of said platform, commencing farther from the first end of said platform than the flat panel commences and running toward the first end of said platform;

a second stop located near the second end of said platform; and one or more spring-loaded clamps slidably mounted to said platform.

5. The clip as recited in claim 1, wherein:

the angle between said first substantially planar member and said main member is ten degrees.

6. The clip as recited in claim 5, further comprising:

a generally planar hub attached to and extending from the second side of said main member, said hub having a keyhole-shaped center aperture and one or more détentes radially arranged around a head of the keyhole-shaped center aperture;

an elongated substantially planar platform having a first end, a second end, a first side, and a second side;

a keyhole-shaped center pin attached to the first side of said platform;

a raised section with dimensions selected such that said raised section fits into any of the détentes of said hub;

a flat panel located on the first side of said platform but farther toward the second end of said flat panel than is the raised section;

a first stop located on the second side of said platform, commencing farther from the first end of said platform than the flat panel commences and running toward the first end of said platform;

a second stop located near the second end of said platform; and one or more spring-loaded clamps slidably mounted to said platform.

\* \* \* \* \*